United States Patent [19]

Moynihan

[11] 4,419,132
[45] Dec. 6, 1983

[54] PRINTING INK

[75] Inventor: John T. Moynihan, Phillipsburg, N.J.

[73] Assignee: American Newspaper Publishers Association, Easton, Pa.

[21] Appl. No.: 337,220

[22] Filed: Jan. 6, 1982

[51] Int. Cl.³ .............................................. C09D 11/06
[52] U.S. Cl. ........................................ 106/27; 106/31
[58] Field of Search .................................... 106/27, 31

[56] References Cited

U.S. PATENT DOCUMENTS

| | | | |
|---|---|---|---|
| 1,738,798 | 12/1929 | Richter et al. | 106/27 |
| 1,860,043 | 5/1932 | Ludwigsen | 106/28 |
| 2,348,594 | 5/1944 | Bernardl | 106/29 |
| 2,385,793 | 10/1945 | Carman et al. | 106/29 |
| 2,416,676 | 3/1947 | Bernardl et al. | 106/29 |
| 4,107,327 | 8/1978 | Tilson et al. | 428/304 |
| 4,193,815 | 3/1980 | Burris | 106/31 |

FOREIGN PATENT DOCUMENTS 597701 3/1978 U.S.S.R. .

Primary Examiner—John Kight, III
Assistant Examiner—Amelia B. Yarbrough
Attorney, Agent, or Firm—David H. Semmes; Warren E. Olsen

[57] ABSTRACT

A non-petroleum base newspaper printing ink comprising a blend of Gilsonite (uintaite) flakes and tall oil fatty acids, together with carbon black pigment. The proportions of the Gilsonite and the tall oil fatty acids may be varied, as viscosity requirements change due to differences in press speeds, newsprint characteristics, and the like. The ink thus has readily adjustable viscosity, together with an enhanced flow and penetration characteristics, while being extremely economical to manufacture.

7 Claims, No Drawings

PRINTING INK

BACKGROUND OF THE INVENTION (1) Field of the Invention

Printing inks, particularly newspaper printing inks which have a non-petroleum base, so as to be environmentally acceptable, while providing reduced misting with extra mileage and good quality.

(2) Description of the Prior Art

Richter et al. U.S. Pat. No. 1,738,798

Ludwigsen U.S. Pat. No. 1,860,043

Bernardi U.S. Pat. No. 2,348,594

Carman U.S. Pat. No. 2,385,793

Bernardi et al. U.S. Pat. No. 2,416,676.

The foregoing references are discussed in a Prior Art Statement, being submitted separately.

SUMMARY OF THE INVENTION

According to the present invention, a non-petroleum base ink is formulated from carbon black pigment and a blend of Gilsonite (uintaite) with tall oil fatty acid. The resultant printing ink provides an ink having enhanced viscosity, flow and penetration characteristics, while being exceptionally economical to manufacture. As a result, the ink is highly suitable for printing at contemporary press speeds, is quick drying and, thus, avoids the conventional problems of "offset" and "strike thru".

DESCRIPTION OF THE PREFERRED EMBODIMENTS

The present ink, having a non-petroleum base, is without dependence upon a diminishing petroleum supply, may be readily disposed without especial precaution, is environmentally acceptable and competitive in cost with the materials used in commercial letterpress and offset inks.

Typical formulations include:

EXAMPLE I

A. Formulation of "ANPA-247" Letterpress Ink

| MATERIAL | SOURCE | % by WEIGHT |
| --- | --- | --- |
| Elftex Pellets 115 Carbon Black | Cabot Corporation 125 High Street Boston, MA 02110 | 16.5 |
| 70/30 FA-1-Gilsonite Blend | Arizona Chemical Corp. Wayne, NJ 07470 | 83.5 |
| TOTAL | | 100.0 | which breaks down to:

| | % |
| --- | --- |
| Carbon | 16.5 |
| Gilsonite | 25.1 |
| Tall Oil Fatty Acid* | 58.4 |

*FA-1 Tall Oil Fatty Acid, specified as follows:

| Product Characteristics | Specification | Typical Lot |
| --- | --- | --- |
| Color, Gardner, 1963 | 9 max | 5 |
| Acid Value | 190 min. | 194 |
| Saponification Value | | 197 |
| Iodine Value | | 131 |
| Composition | | |
| Moisture, % | Less than | 0.1 |
| Ash, % | Less than | 0.001 |
| Rosin Acids, % | 5.0 max | 4.5 |
| Unsaponifiables % | 3.0 max | 2.7 |
| Fatty Acids Total, % | | 92.8 |
| Fatty Acid Composition | | |
| Linoleic, Non-Conjugated, % | | 34 |
| Linoleic, Conjugated, % | | 9 |
| Oleic, % | | 44 |
| Saturated, % | | 5 |
| Other Fatty Acids, % | | 8 |
| Specific Gravity, 25°/25° C. | | 0.906 |
| Weight Per Gallon, 25° C., Lbs. | | 7.53 |
| Viscosity, Gardner-Holdt, 25° C. | | A |
| Viscosity, SUS, 100° F. | | 100 |
| Flash Point, Open Cup, °F. | | 400 |
| Fire Point, Open Cup, °F. | | 440 |

Procedure

70 Parts by weight of FA-1 grade tall oil fatty acids are heated with 30 parts of ZECO 11 A grade Gilsonite from Ziegler Chemical Corporation at 300° F. After solution of the solid Gilsonite, the blend is cooled and filtered. After the blend is made, carbon pigment is dispersed within the blend with a Morehouse Mill. The carbon black pellets were ground to a National Printing Ink Research Institute grindometer reading of one (1). Viscosity adjustment can be made by adding small amounts of tall oil fatty acid as a final step, if necessary.

B. Physical Properties of "ANPA-247"

| Brookfield Viscosity | 420 Poises |
| --- | --- |
| Inkometer Tack* (400 RPM-1 minute) | 3.0 |

*Graphic Arts Technical Foundation Inkometer

C. Environmental Data

Gilsonite has been the subject of long-term animal studies, which indicate it is a non-toxic organic substance which is noncarcinogenic. In accordance with Section 710.4 of the Toxic Substances Control Act, Gilsonite, as a naturally occurring mineral, is automatically included in the initial inventory. The Chemical Abstract Registry Number is 12002-43-6.

D. Comparison with Commercial Letterpress Inks

The Easton (PA) Express tests showed ANPA-247 ink to print well, to be low-misting, and to have high mileage. Laboratory tests at ANPA/RI for misting, viscosity, and tack, shown in the following table, point out the differences between it and standard letterpress ink as used at The Express.

| MISTING, VISCOSITY, TACK OF ANPA-247 | | | |
| --- | --- | --- | --- |
| INK | Densitometer Reading of Mist | Brookfield Viscosity Poises | Inkometer Tack 400 R.P.M. |
| Blank Board | 0.14 | | |
| ANPA-247 | 0.22 | 420.0 | 3.0 |
| Standard Ink | 0.58 | 31.5 | 1.75 |

EXAMPLE II

A. Formulation of ANPA-247B Letterpress Ink

The foregoing Example I refers to runs on regular letter-press. The 247B ink, which was made to run on an Anilox press, was formulated as follows:

| MATERIAL | SOURCE | % by WEIGHT |
|---|---|---|
| Elftex Pellets 115 Carbon Black Pigment | Cabot Corporation 125 High Street Boston, MA 02110 | 18.1 |
| Gilsonite (Zeco 11A) | Ziegler Chemical & Mineral Corp. P.O. Box 455 Great Neck, NY 11021 | 16.4 |
| FA-1 Grade Tall Oil Fatty Acids | | 65.5 |
| | | 100.0 |

This formulation increases mileage of the ink significantly, compared to commercial letterpress ink.

The ANPA-247B blend can also be used for offset inks. An ink with about 20% carbon content and the remainder being the above-described blend, has been printed successfully on a Goss Urbanite offset press.

B. Comparison with Commercially Available Oil Base Inks

The Easton (PA) Express, when running ANPA-247 non-petroleum ink, had pointed out that the mileage for the ink was very good. By their estimates, it was at least 30% better. Consequently, a sample of their regular production oil base ink was obtained and a comparison was run on the two inks on a Hoe Letterpress.

Each ink was run on about 900 lbs., or one roll of paper each, and the amounts of ink were weighed before and after the run to determine the amount consumed. The same plates and impression pressures were used. ANPA-247 produced 35% more pages per pound at a comparable solids print density of 0.98, which is the density used at The Express.

It is apparent from the above formula tabulation that the amount of Gilsonite in the ink may be varied from about 16% to about 25%. If the Gilsonite content is reduced significantly, strike thru and smearing of the newsprint are accentuated. If the Gilsonite content is increased significantly above 25%, viscosity will increase to the extent that poor flow and uneven lay or coverage will result in printed copy. Also, less mileage will ensue, since the amount of pigment will need to be reduced in order to allay the increased viscosity, inasmuch as pigment content increases viscosity. Thus, reduction in pigment content would decrease mileage.

EXAMPLE III

| Carbon black pigment | 17% |
|---|---|
| Gilsonite (uintaite) | 18.6% |
| Tall oil fatty acid | 64.4% |

The foregoing example was used at Allentown Call providing a more fluid ink, for printing at faster speeds than the Example I ink.

In printing with contemporary high speed presses, which may produce 80,000 impressions per hour, one cannot use inks which require oxidation or drying, so as to prevent smear. The present ink is adapted to have a special viscosity, enabling it to be absorbable in contemporary newsprint. The Gilsonite ingredient enhances the viscosity, such that there is less penetration into the newsprint fibers while eliminating smearing. The Gilsonite may be obtained commercially at $0.11 per pound. The letterpress ink may be formulated, so as to have a viscosity in the range of 20-500 poises. Operating at press speeds of 50,000 impressions per hour, it was found that the ink having a viscosity of 90 poises did not dry fast enough. Ink viscosity of approximately 35 poises was approximately correct. In addition, the "flow" characteristic of the ink, that is, the ability to flow over the plate surfaces while covering the dots on the plate, is a critical parameter. It is found that at a plate temperature of 25° C. (77° F.), enough Gilsonite must be employed to retard the flow within a sufficient range.

EXAMPLE IV

| ANPA-247 OFFSET INK | |
|---|---|
| FA-1 tall oil fatty acids | 54.90% |
| Gilsonite | 23.53% |
| Carbon black | 21.57% |
| | 100% |

The acid fountain solution had a pH of 3.5–4.0 and was made from Varn Products Company concentrate.

Flow characteristics and viscosities of various ink formulations have been determined, as follows:

Formulation %

| FLOW IN INCHES 25° C. (77° F.) | | | | | |
|---|---|---|---|---|---|
| | Ink 287B | 283 | 247-1 | 276 | 293 |
| FA-1 | 66.2 | 64.14 | 56.4 | 66.1 | 70.1 |
| Carbon | 9.5 | 17.02 | 19.8 | 16.2 | 12.3 |
| ZECO 11A | 24.3 | 18.54 | 23.8 | 17.7 | 17.6 |
| TIME, MINUTES | Ink 287B | 283 | 247-1 | 276 | |
| 1 | 6¼ | 3 | 1¼ | 3¾ | 9¼ |
| 2 | 8¼ | 4¼ | 1⅝ | 4¾ | 12¼ |
| 3 | 9¾ | 5 | 2⅝ | 5¾ | 14¾ |

BROOKFIELD VISCOSITY

The lower limit of viscosity and upper limit of flow has not been determined to date. The ink appears to have less strike-through even at low viscosities and at long flow length versus petroleum inks.

Principal advantages of the ink include the capability of printing at high press speeds, the low cost of formulation and the elimination of petroleum, so as to avoid any chance of petroleum toxins in some inks. The ingredients, Gilsonite, may be fed to animals and indeed, fatty acids are edible.

It is found that letterpress and offset inks having a viscosity in the range 20-over 1000 poises may be suitable. The over 1000 poises ink would be the upper limit when the inking cylinder actually contacts a reservoir of ink. Ink of such viscosity would be difficult to pump in some modern press usage. The ink viscosity is related, of course, to the density of the newspaper stock and, the thickness of the page, as well as press speed.

A low viscosity letterpress and flexographic ink formulated for fast drying and decreased set-off onto other sheets of paper in the folded newspaper is:

EXAMPLE V

| Carbon black pigment | 12.3% |
|---|---|
| Gilsonite (uintaite) | 17.6% |
| Tall oil fatty acid | 70.1% |

|         |
|---------|
| 100%    |

Manifestly, various proportions of the Gilsonite and tall oil ingredients may be employed without departing from the spirit of invention.

I claim:

1. A printing ink consisting essentially of:
    a. Carbon black pigment 16.5%
    b. Gilsonite 25.1%, and
    c. Tall oil fatty acid 58.4%.

2. A printing ink consisting essentially of:
    a. Carbon black pigment 18.1%
    b. Gilsonite 16.4%, and
    c. Tall oil fatty acid 65.5%.

3. A printing ink composition consisting essentially of:
    a. Carbon black pigment 17%
    b. Gilsonite 18.6%, and
    c. Tall oil fatty acid 64.4%.

4. A printing ink as in claim 1, wherein 70 parts by weight of tall oil fatty acids are heated with 30 parts of Gilsonite then cooled and filtered prior to dispersing with carbon black pigment.

5. A printing ink as in claim 4, wherein said Gilsonite and tall oil fatty acids are blended by heating at approximately 300° F. prior to cooling, filtering and dispersing with carbon black pigment.

6. An offset printing ink consisting essentially of:
    a. Carbon black pigment 21.57%
    b. Gilsonite 23.53%, and
    c. FA-1 Tall oil fatty acid 54.90%.

7. A printing ink composition consisting essentially of:
    a. Carbon black pigment 12.3%
    b. Gilsonite 17.6%, and
    c. Tall oil fatty acid 70.1%.

* * * * *